United States Patent [19]

McHugh

[11] 4,223,478
[45] Sep. 23, 1980

[54] AGRICULTURAL CHEMICAL APPLICATOR
[76] Inventor: Dennis P. McHugh, Box 429, Sioux Rapids, Iowa 50585
[21] Appl. No.: 36,389
[22] Filed: May 4, 1979
[51] Int. Cl.³ .............................................. B05C 1/00
[52] U.S. Cl. ....................................... 47/1.5; 239/166
[58] Field of Search ........................ 47/1.5, 1.7, 1.43; 239/166

[56] References Cited
U.S. PATENT DOCUMENTS

| | | | |
|---|---|---|---|
| 2,935,818 | 5/1960 | Crane | 47/1.5 |
| 2,976,647 | 3/1961 | Pickrell | 47/1.7 X |
| 4,019,278 | 4/1977 | McKirdy | 47/1.5 |

Primary Examiner—Robert E. Bagwill
Attorney, Agent, or Firm—Zarley, McKee, Thomte, Voorhees & Sease

[57] ABSTRACT

The agricultural chemical applicator of the present invention comprises a roller frame assembly having folding wing sections at opposite ends thereof. Rollers are mounted on each of the frames and include a liquid absorbing material which receives an agricultural chemical from a dispensing conduit located above the roller. A wiper engages the roller to prevent excess liquid from dripping off of the roller. The rollers are connected for driving engagement by interlocking lugs at the ends of the rollers adjacent the hinged joints of the roller wings.

8 Claims, 10 Drawing Figures

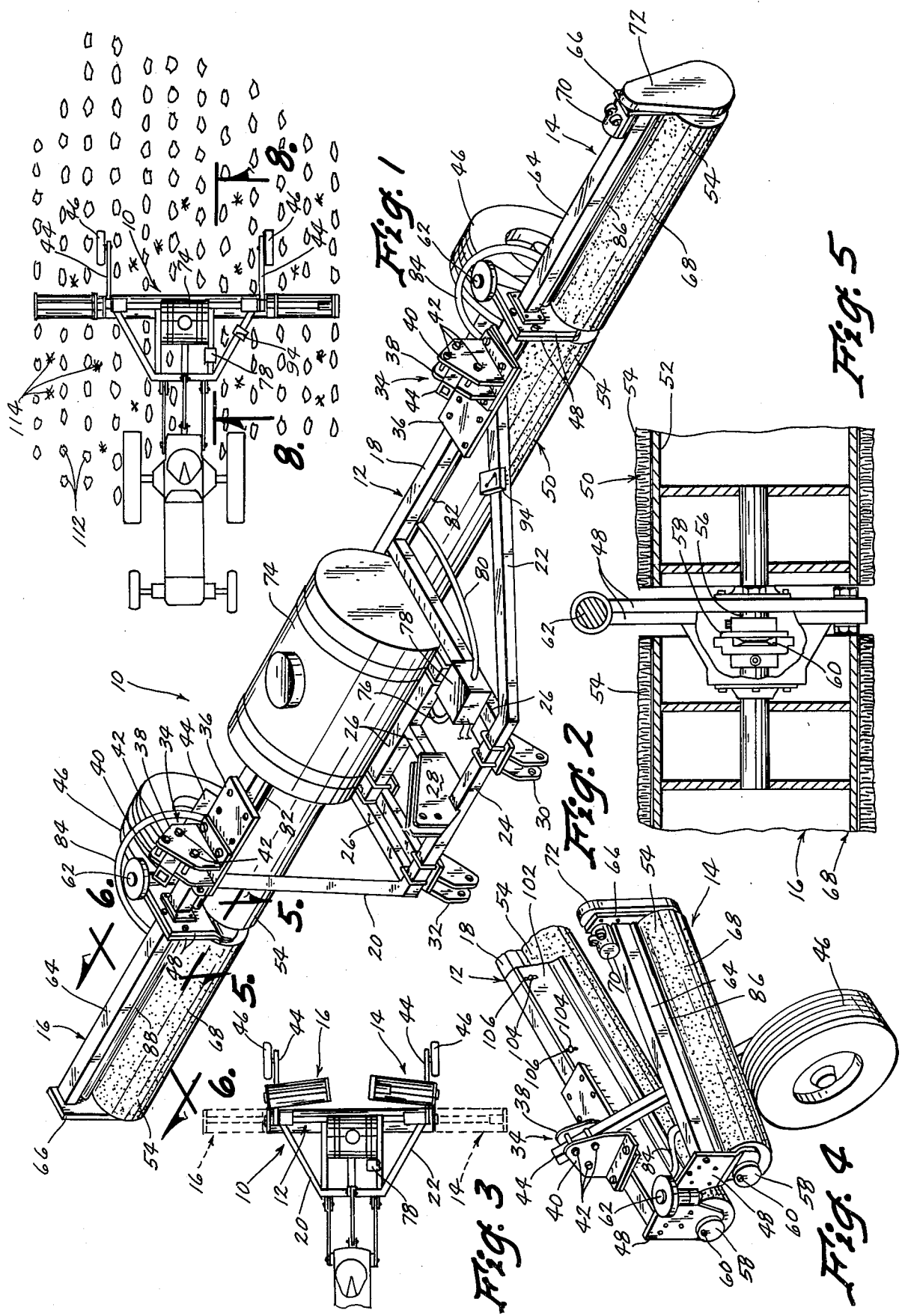

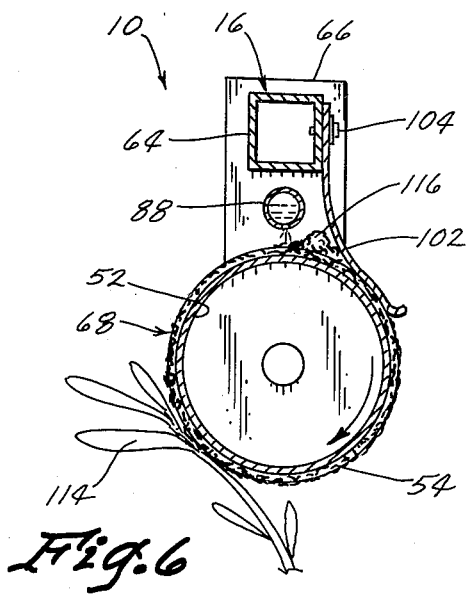
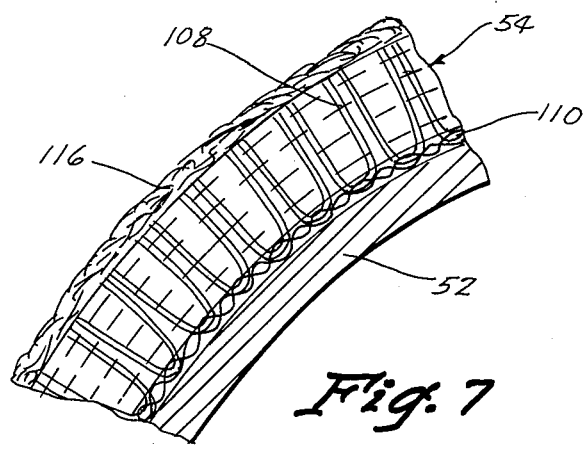
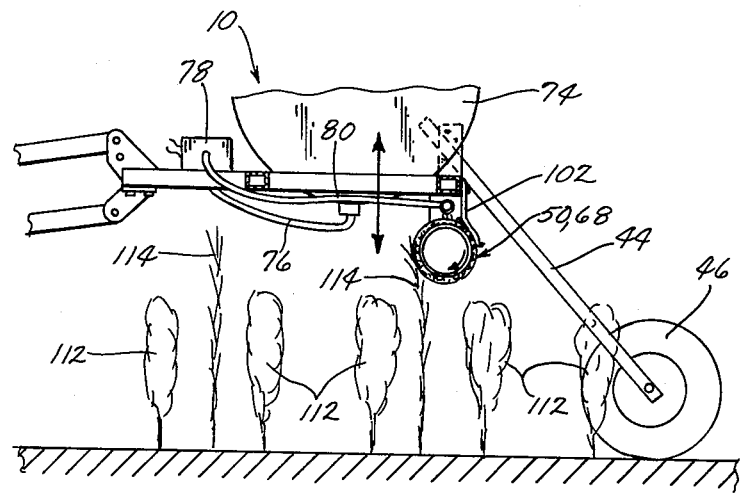
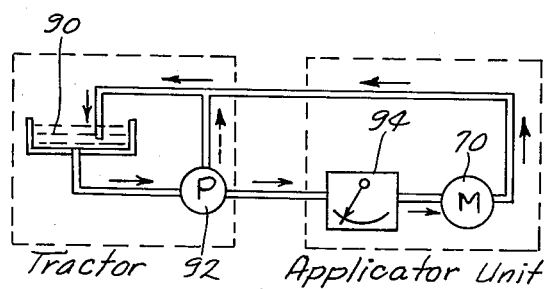
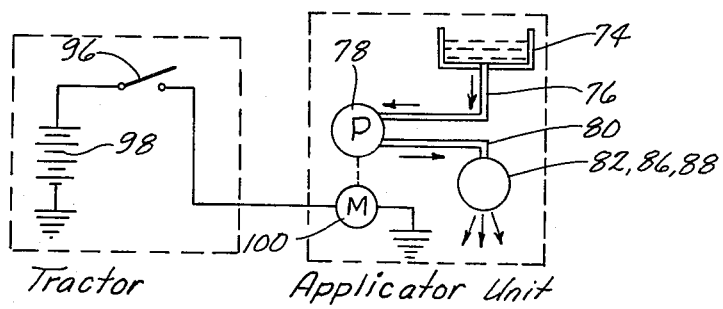

AGRICULTURAL CHEMICAL APPLICATOR

BACKGROUND OF THE INVENTION

This invention relates to an agricultural chemical applicator.

The removal of weeds and other undesirable plants from a growing crop by means of herbicides presents certain problems in removing the undesirable plants without injuring or destroying the desired plants. In some cases selective herbicides are used which do not damage the crop being cultivated but which destroy the undesirable plants. However, with certain crops the choice of selective herbicides is either very limited or in some cases there are no selective herbicides which work satisfactorily.

Certain herbicides have been developed which will destroy a plant by applying only a small amount of the herbicide to the plant leaves. The herbicide enters the plant, travels to the roots of the plant, and destroys it. These herbicides are effective if they can be applied to the upper tips of the undesirable weeds or volunteer plants which extend above the crop being grown.

Devices have been provided which can be moved through the fields at a level above the upper ends of the desired crop, but at a level which will permit them to engage the upper tips of the undesirable plants which protrude above the crop. With such devices, care must be exercised to prevent the dripping of the herbicide down onto the crop being cultivated. Contact of the herbicide with the desired crop must be minimized.

Such devices must also be easily adjustable to varying heights for different types of crops.

SUMMARY OF THE INVENTION

The present invention utilizes a frame section having rollers mounted thereon. The rollers have a moisture absorbing material on their outer surface, and the herbicide is dripped onto this moisture engaging surface. The rollers are transported through the field at a level above the tops of the crop being cultivated, and the rollers engage the weeds which protrude up above the top of the crop being cultivated. This method has been found effective for example for the removal of volunteer corn from a field of soybeans. The corn plants protrude upwardly above the soybeans, and are engaged by the roller without exposing the soybean plants to herbicide.

The device of the present invention includes folding wings which may be folded for transporting, but which may be extended when the device is used in the field. The rollers on the wing sections and in the central section include lugs which intergage when the wings are extended to their straight position. These lugs interact to transfer rotational movement of the rollers from one roller to another so that a driving motor need only be connected to one of the rollers for actuating all of the rollers.

Therefore, a primary object of the present invention is the provision of an improved chemical applicator.

A further object of the present invention is the provision of a device which will minimize contact with the desired crop, while maximizing the contact of herbicide with the undesirable weeds or other plants.

A further object of the present invention is the provision of a device which can be easily adjusted to accommodate crops of different heights.

A further object of the present invention is the provision of a device which will apply herbicide to the undesirable weeds, but which will not drip the herbicide onto the crop being cultivated.

A further object of the present invention is the provision of a device which can easily control the speed of roller rotation.

A further object of the present invention is the provision of a device which has means for easily controlling the speed of chemical flow onto the rollers.

A further object of the present invention is the provision of a device which can be extended to cover several crop rows while used in the field, but which can be folded into a compact configuration for transporting on roads and highways.

A further object of the present invention is the provision of a device which includes a plurality of rollers having means thereon for transferring rotation from one roller to another.

A further object of the present invention is the provision of a device which is sturdy in construction, economical in manufacture, and efficient in operation.

DESCRIPTION OF THE DRAWINGS

FIG. 1 is a top plan view of the device being used in a field.

FIG. 2 is a perspective view of the device of the present invention.

FIG. 3 is a top plan view similar to that in FIG. 1, but showing the device in its folded position.

FIG. 4 is a detailed perspective view of the folding hinge of the device.

FIG. 5 is a sectional view taken along line 5—5 of FIG. 2.

FIG. 6 is a sectional view taken along line 6—6 of FIG. 2.

FIG. 7 is a detailed enlarged sectional view of the roller surface of the present invention.

FIG. 8 is a sectional view taken along line 8—8 of FIG. 2.

FIG. 9 is a schematic view of the hydraulic system for operating the rollers.

FIG. 10 is a schematic view of the system for pumping the chemical to the rollers.

DETAILED DESCRIPTION OF THE INVENTION

Referring to the drawings, the numeral 10 generally refers to the applicator of the present invention. Applicator 10 is comprised of a central frame section 12, and two wing sections 14, 16. Central frame section 12 includes a rear transverse bar member 18 having a pair of angularly extending side members 20, 22 connected at its opposite ends and extending forwardly therefrom where they are connected to a forward frame member 24. A plurality of intermediate frame members 26 are interconnected between front and rear frame members 18, 24 to provide reinforcement thereto so that members 18, 20, 22, 24 and 26 form a trapezoidal shaped horizontal platform.

Rigidly fixed to forward frame member 24 are three clevises 28, 30, 32. These clevises are arranged in such a manner to accommodate the three point hitch on conventional farm tractors.

Bolted or otherwise secured to the opposite ends of rear frame member 18 are a pair of wheel receiving brackets 34. Each bracket 34 comprises a base plate 36 bolted or otherwise secured to frame member 18. A pair of spaced apart plates 38, 40 are secured to base plate 36 and extend upwardly therefrom. Plates 38, 40 are interconnected by a plurality of bolts 42.

Slidably embraced between plates 38, 40 are a pair of wheel legs 44. Wheel legs 44 may be moved longitudinally to provide vertical adjustment of their lengths by loosening bolts 42, sliding legs 44 to the desired position and retightening bolts 42 so that plates 38, 40 frictionally and retentively embrace legs 44. Mounted to the lower ends of legs 44 are wheels 46.

Mounted at the extreme opposite ends of rear frame member 18 are a pair of vertical hinge plates 48. Hinge plates 48 are in a vertical plane, and extend downwardly from rear frame member 18. A roller 50 includes a cylindrical core 52 having a chemical absorbing pad 54 mounted on the outer surface thereof. Extending from each opposite end of roller 50 is an axle 56 which is rotatably journaled in plate 48 and which rotates in unison with roller 50. Fixed to axle 56 is a circular head 58 having a lug 60 protruding from its axially presented face. Lug 60 is located spaced radially outwardly from the rotational axis of roller 50.

Hinge plates 48 are each hingedly connected to similar hinge plates 48 of wing sections 14, 16 for pivotal movement about a vertical axis designated by the numeral 62.

Each wing section 14, 16 includes an elongated frame member 64 having vertical hinge plates 48 secured on its inner ends and having similar vertical plates 66 secured at its outer ends. Each frame section 14, 16 includes a wing roller 68 which is rotatably journaled between plates 48, 66.

Wing sections 14, 16 are pivotal about the verical axis 62 from a position such as shown in FIG. 4 to the position shown in FIG. 2. When in the extended straight position of FIG. 2, rollers 68 are in registered alignment with roller 50 so as to form one continuous elongated roller. As can be seen in FIG. 5, lugs 60 at the ends of each roller drivingly engage one another whenever the wing sections are in their straight position, thereby transmitting rotational movement from one roller to the other rollers. A hydraulic motor 70 is mounted at one end of one wing section 14 and through a chain and sprocket drive system 72 rotates roller 68. This rotational movement is transferred from roller 68 to central roller 50 to the other wing roller 68 at the opposite end of the device.

Mounted on central frame sections 12 is a chemical reservoir 74. A hose 76 carries chemical from reservoir 74 to a pump 78 which is adapted to be electrically operated. Pump 78 forces the chemical through another hose 80 to a dispensing conduit 82 which is mounted beneath rear frame member 18 and above roller 50 and extends along the length of roller 50. Dispensing conduit 82 includes a plurality of openings along the length thereof for permitting the fluid to be dispensed onto the liquid absorbing surface 54 of roller 50.

At the opposite ends of dispensing conduit 82 are connected a pair of coupling hoses 84 which convey chemical fluid from dispensing conduit 82 to a pair of corresponding dispensing conduits 86, 88 similar to conduit 82 and located on wing sections 14, 16, respectively.

Referring to FIG. 9, the system for operating the rotational speed of the rollers is shown in schematic diagram. The system includes a reservoir 90 and a pump 92 which are included in the conventional farm tractor. These hydraulic components are connected by conventional means to a variable speed control 94 (which is mounted on frame member 22, FIG. 2) and hydraulic motor 70. By changing the control 94, the operator can adjust the speed at which the rollers rotate.

Referring to FIG. 10, the system for controlling the speed at which the fluid is dispensed is shown in schematic diagram. A switch 96 and battery 98 are located on the farm tractor and reservoir 74, pump 78 and dispensers 82, 86 and 88 are located on the applicator. Pump 78 is driven by an electric motor 100 which is located in the electrical circuitry with switch 96 and battery 98. Thus, the operator on the tractor can open or close switch 96 to cause fluid to be dispensed on the roller as desired.

As shown in FIGS. 4 and 6, a wiper 102 is made of flexible material which engages the fluid absorbing material on the outer surface of the rollers. Wiper 102 is adjustably attached to the respective frame members 64, 18 by screws 104 which extend through vertical slots 106 in wiper 102. Loosening of screws 104 permits vertical adjustment of wiper 102.

Each roller includes a metal cylindrical core 52 to which is secured a fluid absorbing material 54. Material 54 is preferably carpet having loops 108 (FIG. 7) and a backing material 110.

In operation, the device is connected to the three point hitch of a conventional farm tractor. Wheels 46 are adjusted so that the height of rollers 50, 68 is slightly above the tops of the crop plants which are being cultivated. In FIG. 8, the crop being cultivated is designated by the numeral 112. As device 10 is moved through the field, chemical is dispensed onto the rollers and is absorbed by the material 54 thereon. The rollers are rotated, and they engage the weeds or volunteer plants 114 which protrude above the tops of the crop being cultivated. The chemical is of a nature which causes the killing of the plant upon contact, and as the rollers engage the upper ends of plants 114, the chemical goes through the plant and kills it.

Wiper 102 prevents the fluid from dripping onto the plants being cultivated, and also facilitates even distribution of the fluid around the entire circumference and along the entire length of the roller. As can be seen in FIG. 6, there is a slight accumulation of chemical behind the wiper 102, and this accumulation is designated by the numeral 116. Rotation of the rollers causes more complete frictional engagement between the roller and the weed 114. Because the height of the device is easily adjustable and because the operator can easily adjust the speed of rotation of the rollers and the speed at which the chemical is dispensed, the operator can easily minimize the contact between the roller and the desired cultivated crop, while at the same time maximizing contact between the roller and the weeds which are undesirable. Thus, it can be seen that the device accomplishes at least all of its stated objectives.

What is claimed is:

1. An agricultural chemical applicator comprising:
   a roller frame assembly having at least first and second elongated frame sections;
   each of said frame sections having an elongated roller rotatably journaled therein for rotational movement about a rotational axis, said roller having an outer cylindrical surface covered with a liquid absorbing material;
   hinge means interconnecting said first and second roller frame sections for articulated swinging movement from a straight position wherein said rotational axes of said rollers of said first and second frame sections are in approximate registered alignment to a folded position wherein said rotational axes are articulated with respect to one another;

each of said rollers having lug means connected thereto and positioned adjacent said hinge means;

said lug means of said roller of said first frame section being positioned to engage said lug means of said roller of said second frame section when said frame sections are in said straight position whereby rotational movement of one of said rollers will be transmitted to the other of said rollers;

power means connected to said one roller for rotating said one roller;

chemical dispensing means mounted to said frame sections above said rollers and being connected to a source of liquid chemicals for dispensing said liquid chemicals onto said liquid absorbing material on said rollers;

wiper means mounted on said frame sections and functionally engaging said liquid absorbing material of said rollers for wiping excess liquid chemical therefrom to prevent said chemical from dripping off said rollers.

2. An applicator according to claim 1 wherein at least one wheel support leg is operatively connected to said frame assembly and extends downwardly therefrom, a ground engaging wheel being rotatably mounted on the lower end of said leg, adjusting means connecting said leg to said frame assembly for permitting selective adjustable securement of said leg to said frame assembly for causing adjustment of the distance of said ground engaging wheel below said frame assembly.

3. An applicator according to claim 2 wherein said adjustment means comprises a yoke having spaced apart side members embracing said leg therebetween, bolt means interconnecting said side members for permitting selective tightening and loosening of the frictional engagement of said side members against said leg.

4. An applicator according to claim 1 wherein each of said rollers include shafts extending axially therefrom adjacent said lug means, said lugs being mounted in fixed relation to said shafts.

5. An applicator according to claim 4 wherein a circular head is mounted on each of said shafts and includes a circular flat surface facing axially away from said roller, said leg protruding axially from said flat surface and being spaced radially from said rotational axis of said roller.

6. An applicator according to claim 5 wherein said circular flat surfaces of said heads on said rollers of said first and second frame sections are in facing registered alignment when said frame sections are in said straight position.

7. An applicator according to claim 1 wherein said dispensing means comprises an elongated conduit having a plurality of openings spaced along the length thereof for permitting said fluid chemical to drip onto said rollers.

8. An applicator according to claim 1 wherein said wiper means comprises a flexible squeegee frictionally engaging said liquid absorbing material along the length of each of said rollers.

* * * * *